United States Patent [19]

Marcoux

[11] Patent Number: 5,509,231
[45] Date of Patent: Apr. 23, 1996

[54] METHOD OF RETARDING VEGETATION GROWTH

[75] Inventor: B. Paul Marcoux, Myers, Fla.

[73] Assignee: Flexstake, Inc., Fort Myers, Fla.

[21] Appl. No.: 365,500

[22] Filed: Dec. 28, 1994

Related U.S. Application Data

[63] Continuation-in-part of Ser. No. 195,863, Feb. 14, 1994, abandoned.

[51] Int. Cl.⁶ .................................................. A01G 17/00
[52] U.S. Cl. ........................................ 47/58; 47/9; 47/25
[58] Field of Search .............................. 47/9 S, 25, 25 R, 47/DIG. 13, 58.01

[56] References Cited

U.S. PATENT DOCUMENTS

| | | |
|---|---|---|
| 2,858,736 | 11/1958 | Hendrix ........................................ 47/25 |
| 3,305,969 | 2/1967 | Mattson . |
| 3,477,181 | 11/1969 | Robison . |
| 3,515,373 | 6/1970 | Abbe . |
| 3,704,004 | 11/1972 | Carter ........................................ 47/25 R |
| 3,803,760 | 4/1974 | Matvey . |
| 3,806,096 | 4/1974 | Eccleston et al. . |
| 4,321,769 | 3/1982 | Tisbo et al. . |
| 4,502,244 | 3/1985 | Yoham . |
| 4,858,378 | 8/1989 | Helmy . |
| 4,932,157 | 6/1990 | Shimp ........................................... 47/25 |
| 4,934,093 | 6/1990 | Yanna . |
| 5,090,154 | 2/1992 | Jacob ........................................... 47/9 S |
| 5,285,594 | 2/1994 | Penny . |
| 5,323,557 | 6/1994 | Sonntag . |
| 5,396,731 | 3/1995 | Byrne ........................................... 47/25 |

FOREIGN PATENT DOCUMENTS

| | | |
|---|---|---|
| 2078479 | 1/1982 | United Kingdom . |
| 85/01418 | 4/1985 | WIPO ........................................... 47/25 |

*Primary Examiner*—Henry E. Raduazo
*Attorney, Agent, or Firm*—James E. Bradley; Grady K. Bergen

[57] ABSTRACT

A method for preventing the growth of vegetation around structures extending from the ground is disclosed. The method consists of providing a substantially flat, flexible mat of a polymeric material having a substantially uniform thickness. An aperture is provided in the mat so that the mat can be positioned around a structure extending from the ground. A slit may also be formed in the mat to facilitate the positioning of the mat around the structure. The mat has a substantial weight to prevent lifting of the mat from the surface around the structure without staking or securing the mat to the structure or ground. Because the mat has a low profile or thickness, mowers may be easily passed over the mat without damaging the mat or the mower.

18 Claims, 2 Drawing Sheets

METHOD OF RETARDING VEGETATION GROWTH

This is a continuation-in-part of application Ser. No. 08/195,863, filed Feb. 14, 1994, and now abandoned.

BACKGROUND OF THE INVENTION

1. Field of the Invention

This invention relates to a method for preventing the growth of vegetation around structures which extend from a surface capable of supporting the growth of vegetation.

2. Description of the Prior Art

The maintenance of grass covered areas along roadsides and other areas is often difficult because of sign posts and other structures which protrude from the ground. To avoid colliding with these structures during mowing, areas of grass and vegetation surrounding these structures are usually left uncut. Left uncut, these areas become unsightly so that special trimming equipment or herbicides must be used. Because of the large areas that must be mowed and maintained along road sides, the cost and amount of time consumed in carefully mowing around these structures and in trimming or applying herbicide can be very significant.

What is needed is a method for preventing the growth of grass or vegetation adjacent to structures extending from the ground, such as sign posts, which would otherwise be left uncut without the use of special trimming equipment or herbicides.

SUMMARY OF THE INVENTION

A method of preventing growth of vegetation adjacent to structures extending from a surface capable of supporting the growth of vegetation is provided. The method comprises the steps of providing a substantially flat, flexible mat made of a polymeric material, such as rubber or plastic. The material is of a substantially uniform thickness and is impervious to both light and moisture. The mat is defined by an outer edge and configured to overlay the surface. An aperture is provided in the mat for receiving the structure which extends from the surface. By positioning the mat against the surface so that the structure extends through the aperture, the growth of vegetation adjacent to the structure can be prevented. The mat has a sufficient weight to prevent lifting of the mat from the surface without staking or securing the mat to the structure when subjected to suction or air movement, such as that created by a power mower used for the cutting of vegetation.

DETAILED DESCRIPTION OF THE INVENTION

Figure 1:
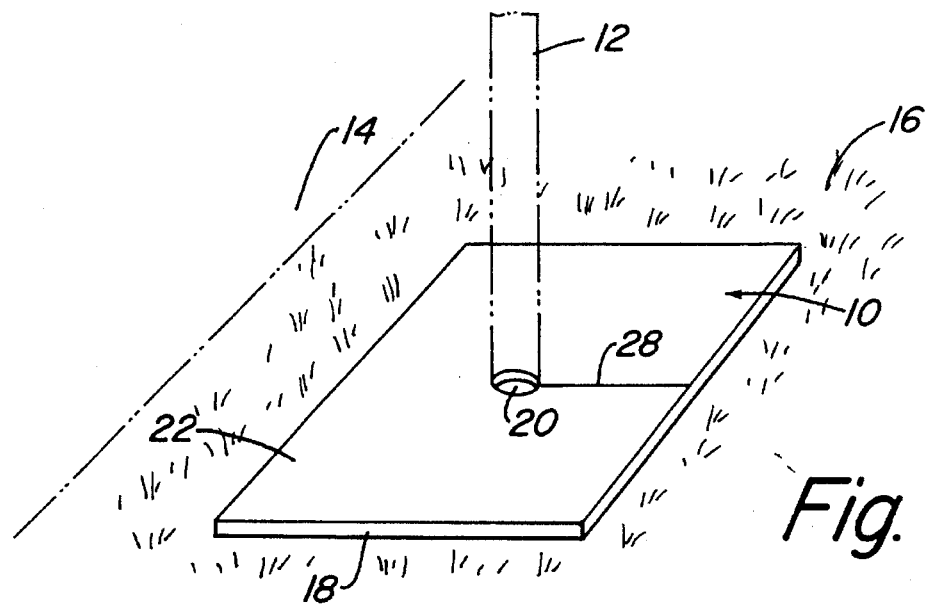
FIG. 1 is a perspective view of a mat applied to a surface and surrounding a structure in accordance with the invention.

Referring to FIG. 1, a mat 10 is shown surrounding a roadway post 12 which is located adjacent to a road or highway 14. The roadway post 12 extends from a surface 16 of earth which is capable of supporting the growth of plant life, such as grass, weeds and other vegetation. The post 12 is merely representative of a structure extending from the surface 16. It should be noted that other structures having a different geometry or shape could also be accommodated by the mat 10.

The mat 10 is flexible and formed from a durable polymeric material, such as recycled rubber or plastic, which is impervious to light and moisture. Reground tire rubber from used automobile tires provides a suitable material for the mat 10. This material is readily available and is not easily deformed when subjected to high compressive forces such as those created by mowers or heavy vehicles passing over the mat 10.

The mat 10 is substantially flat and has a substantially uniform thickness. The mat 10 can have a thickness ranging substantially between three-sixteenth and 2½ inches. However, a thickness between three-sixteenths to five-eighths inch is preferred, with approximately one-quarter inch being the most preferred thickness. This gives the mat 10 a low enough profile to allow a mower to pass over the mat 10 without impeding the mower or damaging the mat 10.

The mat 10 should have a sufficient weight to prevent lifting of the mat 10 from the surface 16 without the use of separate weights or requiring staking, anchoring or otherwise securing the mat 10 to the ground or another structure when the mat 10 is subjected to suction or air movement such as that created by a power mower. A mat 10 having a weight greater than 0.6 pounds per square foot of surface area has been found to be adequate. Preferably, however, the mat 10 has a weight ranging between about 1 to 2.5 pounds per square foot.

As shown in FIG. 1, the mat 10 has a rectangular configuration defined by an outer edge 18. An aperture 20 is provided in the center of the mat 10 and is spaced far enough from the outer edge 18 so that a mower is able to cut the vegetation surrounding the outer edge 18 of the mat 10 while safely passing around the structure 12 without significantly affecting the speed and operation of the mower. This is typically about a foot or more. The aperture 20 should be sized to closely receive the structure 12 to prevent the growth of vegetation between the structure 12 and the edge of the aperture 20. The aperture 20 may be die cut to the cross-sectional shape of the structure 12. It should be noted that any shape or size mat 10 can be used as long as the aperture 20 is spaced far enough from the outer edge 18. Also, several apertures 20 may be provided in the mat 10 so that a single mat may accommodate several structures. Other than the aperture 20, the mat 10 should be free of holes through which light or moisture can pass through.

Figure 2:
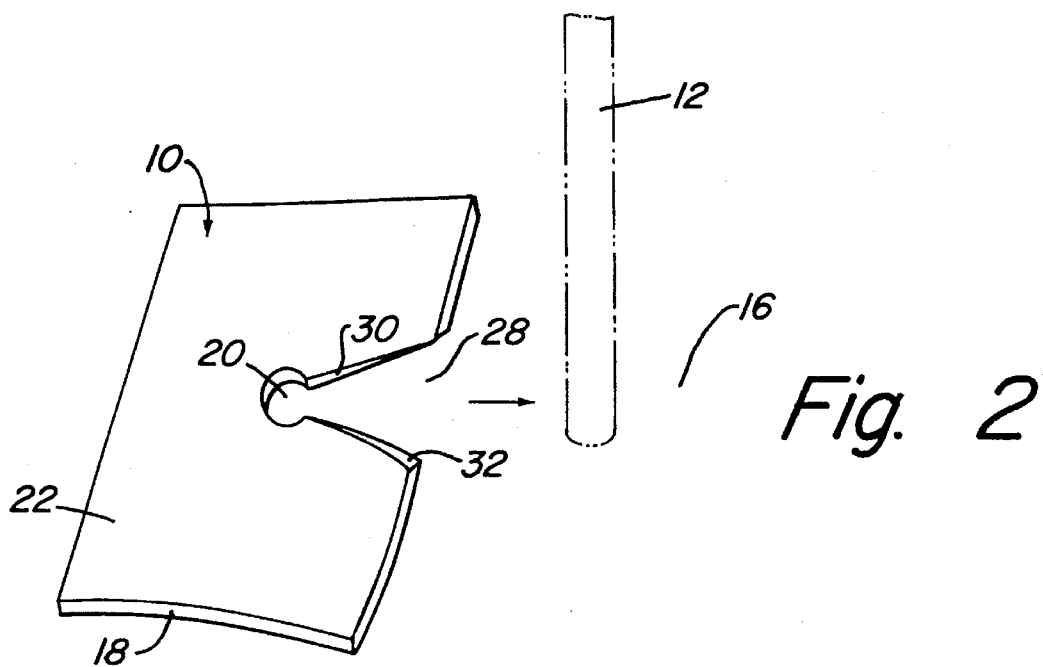
FIG. 2 is a perspective view of the mat of FIG. 1 shown being positioned around the structure.
Figure 3:
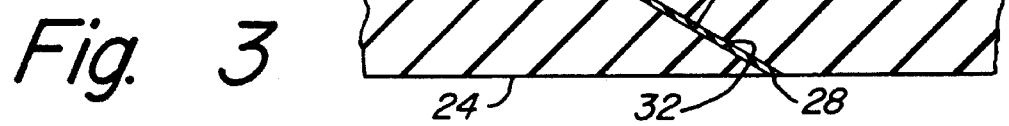
FIG. 3 is a cross-sectional view of a portion of the mat of FIGS. 1 and 2.

The mat 10 has a substantially flat upper and lower surface 22, 24 (FIG. 3). A slit 28 may be formed in the mat 10 which extends from the outer edge 18 to the aperture 20. As shown in FIGS. 2 and 3, the slit 28 is cut into the mat 10 from the outer edge 18 to the aperture 20 at an acute angle of about 15 to 65 degrees relative to the upper and lower surfaces 22, 24 to define substantially flat inner edges 30, 32 (FIGS. 2 and 3) of the slit 28. The edges 30, 32 of the slit 28 are joined together by means of an adhesive layer 36 which can be an epoxy resin or any other adhesive suitable for joining the inner edges 30, 32 together to prevent opening of the slit 28 once the mat 10 is positioned around the structure 12. In order to use the mat 10, a solid piece of the polymeric material forming the mat 10 is provided without the aperture 20 or slit 28. The user, with the use of a cutting tool, forms the aperture 20 in the mat 10 a suitable distance from the outer edge 18. The aperture 20 should extend through the entire thickness of the mat 10 from the upper surface 22 to the lower surface 24 and be configured to closely receive the structure 12. Depending on the type of structure 12 which is to be accommodated by the mat 10, the slit 28 may or may not be formed. If the structure or post 12 has a substantially uniform diameter or width, the end of the structure 12 is merely inserted through the aperture 20 and the mat 10 is slid to the base of the structure 12 and against the surface 16 without forming the slit 28. If the roadway post 12 is used to support a sign plate (not shown), the sign plate may be removed and the mat 10 slid along the post 12 through the aperture 20 until the mat 10 rests on the surface 16. The sign plate can then be reattached after the mat 10 is so positioned.

If it is not possible to slide the post 12 or structure through the aperture 20, the slit 28 is formed by cutting the material of the mat 10 at an acute angle, as shown in FIG. 3. This gives the inner edges 30, 32 of the slit 28 a much larger surface area for bonding than would a slit cut perpendicular to the upper and lower surfaces 22, 24. Once the slit 28 is formed, the inner edges 30, 32 are spread apart by deforming the mat 10 and the mat 10 is moved toward the structure 12, as shown by the arrow in FIG. 2, so that the structure 12 passes through the slit 28 from the outer edge 18 to the aperture 20. Once the structure 12 is received within the aperture 20, the inner edges 30, 32 of the slit 28 are brought together and joined with the layer of adhesive 36. This prevents the mat 10 from being pulled from the structure 12 through the slit 28.

The mat 10 is then pressed against the surface 16 so that the entire lower surface 24 of the mat 10 is in a contacting or near contacting relationship with the ground surface 16. Because the mat 10 is formed from a flexible material, the mat 10 will assume any uneven contours of the surface 16.

Because the mat 10 is impervious to light and moisture, vegetation is prevented from growing under the areas underlying the mat 10. Also, the mat 10 provides a means for preventing erosion of soil from around the post or structure 12 by acting as a barrier to stop loose dirt or soil from being washed or blown away from the surface 16.

Figure 4:
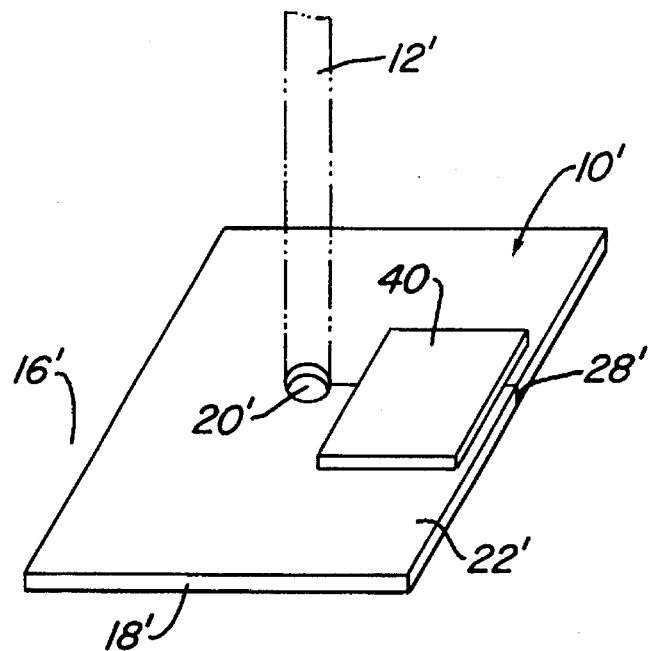
FIG. 4 is another embodiment of the invention, showing a backing material being used to close a slit formed in a mat.
Figure 5:
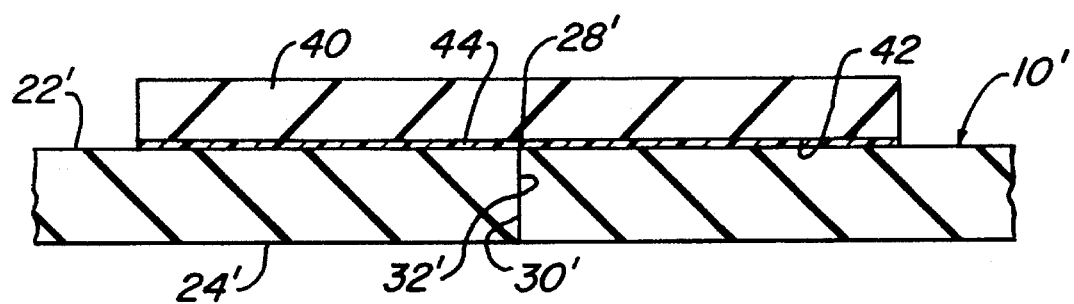
FIG. 5 is a cross-sectional view of the mat of FIG. 4 showing the backing material positioned over the slit.

FIGS. 4 and 5 show another embodiment of the invention In this embodiment, a mat 10', which is similar to the mat 10 shown in FIGS. 1–3, is provided with similar components designated by the same numeral and a prime sign. The mat 10' of FIG. 4 is provided with an aperture 20' and a slit 28'. The slit 28', however is cut at an angle perpendicular to the upper and lower surfaces 22', 24'. The mat 10' is positioned around post 12' in substantially the same manner as described for the mat 10 of FIGS. 1–3. Once the mat 10' is positioned around the structure or post 12', a polymeric backing material 40 made of the same material as the mat 10' is used to close the slit 28'. This is accomplished by placing the lower surface 42 of the backing material 40 against the upper surface 22' of the mat 10' so that the backing material 40 straddles the slit 28'. A layer of adhesive 44 is applied between the lower surface 42 of the backing material 40 and the upper surface 22' of the mat 10' in the area surrounding the slit 28' prior to positioning the backing material 40 over the slit 28'. The backing material 40 is then pressed and joined to the mat 10'.

The method of the invention has several advantages over the prior art. Grass and other vegetation can be prevented from growing around areas where it is difficult to mow without the use of special trimming equipment or herbicides. The mat is easily placed around structures which extend from the ground. There is no need to tie, anchor or secure the mat to the ground or structure nor is there any need for the use of separate weights to prevent the mat from lifting. The mat maintains its position against the ground surface merely by its own weight. It has a sufficiently low profile to enable a mower or other device to be driven or passed over the mat without damaging the mat or the mower.

While the invention has been shown in only two of its forms, it should be apparent to those skilled in the art that it is not so limited, but is susceptible to various changes without departing from the scope of the invention.

I claim:

1. A method for preventing growth of vegetation adjacent to structures extending from a surface which is capable of supporting the growth of vegetation, the method comprising the steps of:

provided a unitary, substantially flat, flexible mat having a uniform composition of flexible polymeric material throughout and which is of a substantially uniform thickness greater than 3/16 inch, the mat being impervious to light and moisture and having a weight greater than about 0.6 pounds per square foot, the mat being defined by an outer edge and configured to overlay and assume uneven contour of the surface;

providing an aperture in the mat for receiving the structure extending from the surface; and then positioning the mat against the surface around the structure wherein the structure extends through the aperture and the mat conforms to the contour of the surface, and wherein the weight of the mat prevents lifting of the mat from the surface when subjected to suction or air movement such as that created by a power mower used for cutting vegetation without staking or otherwise securing the mat to the surface.

2. The method of claim 1, wherein:

the step of providing a substantially flat, flexible mat comprises providing the mat with a thickness which is between about 3/16 to 5/8 inch.

3. The method of claim 1, wherein:

the mat has a weight ranging from between about 1 to 2.5 pounds per square foot.

4. The method of claim 1, wherein:

the aperture is die cut to the cross-sectional shape of the structure.

5. The method of claim 1, further comprising:

providing the mat with a slit which extends through the thickness of the mat from the outer edge to the aperture; and wherein the step of positioning the mat includes passing the structure through the slit to the aperture.

6. The method of claim 5, further comprising:

positioning fastening means over the slit and joining the fastening means to the mat so that the slit is effectively closed after the structure is passed through the slit to the aperture.

7. The method of claim 6, wherein:

the fastening means is comprised of a piece of rubber or plastic backing.

8. The method of claim 1, wherein:

the step of providing a substantially flat, flexible mat of polymeric material comprises selecting the polymeric material from a group consisting of recycled plastic and recycled rubber.

9. A method for preventing growth of vegetation adjacent to structures extending from a surface of earth which is capable of supporting the growth of vegetation and for preventing erosion of soil from around the structure, the method comprising the steps of:

providing a substantially flat, flexible mat having a uniform composition of flexible polymeric material throughout and which is of a substantially uniform thickness between about 3/16 to 5/8 inch, the mat being impervious to light and moisture and the weight of the mat being between about 1 to 2.5 pounds per square foot, the mat being defined by an outer edge and configured to overlay and assume uneven contour of the surface;

providing an aperture in the mat for receiving the structure extending from the surface; and then positioning the mat against the surface around the structure wherein the structure extends through the aperture and the mat conforms to the contour of the surface, and wherein the weight of the mat prevents lifting of the mat from the surface when subjected to suction or air movement such as that created by a power mower used for cutting vegetation without staking or otherwise securing the mat to the surface.

10. The method of claim 9, wherein:

the step of providing a substantially flat, flexible mat of polymeric material comprises selecting the polymeric material from a group consisting of recycled plastic and recycled rubber.

11. The method of claim 9, wherein:

the aperture is die cut to the cross-sectional shape of the structure.

12. The method of claim 9, further comprising:

providing the member with a slit which extends through the thickness of the member from the outer edge to the aperture; and wherein the step of positioning the member includes passing the structure through the slit to the aperture.

13. The method of claim 9, further comprising:

positioning fastening means over the slit and joining the fastening means to the mat so that the slit is effectively closed after the structure is passed through the slit to the aperture.

14. The method of claim 13, wherein:

the fastening means is comprised of a piece of rubber or plastic backing.

15. A method for preventing growth of vegetation around a roadway post extending from a surface of earth adjacent to a roadway which is capable of supporting the growth of vegetation and for preventing erosion of soil from around the roadway post, the method comprising the steps of:

providing a substantially flat, flexible mat of flexible recycled plastic or rubber material and which is of a substantially uniform thickness of greater than 3/16 inch, the mat being impervious to light and moisture and having a weight greater than 0.6 pounds per square foot, the mat being defined by an outer edge and configured to overlay and assume uneven contour of the surface;

providing an aperture in the mat for receiving the structure extending from the surface;

providing the mat with a slit which extends through the thickness of the mat from the outer edge to the aperture;

passing the structure through the slit to the aperture; and positioning the mat against the surface so that the mat conforms to the contour of the surface and around the structure wherein the structure extends through the aperture, and wherein the weight of the mat holds the mat on the surface without staking the mat to the surface or securing the mat to the structure.

16. The method of claim 15, further comprising:

positioning a piece of rubber or plastic backing over the slit and joining the backing to the mat so that the slit is effectively closed after the structure is passed through the slit to the aperture.

17. The method of claim 15, wherein:

the thickness of the mat is between about 3/16 to 5/8 inch.

18. The method of claim 15, wherein:

the weight of the mat is between about 1 to 2.5 pounds per square foot.

* * * * *